United States Patent
Hon

(10) Patent No.: US 10,499,689 B2
(45) Date of Patent: Dec. 10, 2019

(54) ELECTRONIC CIGARETTE WITH SOFT HOUSING

(71) Applicant: FONTEM HOLDINGS 1 B.V., Amsterdam (NL)

(72) Inventor: Lik Hon, Beijing (CN)

(73) Assignee: FONTEM HOLDINGS 1 B.V., Amsterdam (NL)

( * ) Notice: Subject to any disclaimer, the term of this patent is extended or adjusted under 35 U.S.C. 154(b) by 369 days.

(21) Appl. No.: 15/325,240

(22) PCT Filed: Jul. 18, 2014

(86) PCT No.: PCT/CN2014/082484
§ 371 (c)(1),
(2) Date: Jan. 10, 2017

(87) PCT Pub. No.: WO2016/008150
PCT Pub. Date: Jan. 21, 2016

(65) Prior Publication Data
US 2017/0188632 A1 Jul. 6, 2017

(51) Int. Cl.
*A24F 47/00* (2006.01)
*H01M 2/12* (2006.01)

(52) U.S. Cl.
CPC ......... *A24F 47/008* (2013.01); *H01M 2/1264* (2013.01); *H01M 2200/20* (2013.01); *H01M 2220/30* (2013.01)

(58) Field of Classification Search
CPC ..... A24F 47/008; A24F 47/002; A61M 15/06; A61M 11/042; A61M 2205/8206; H05B 2203/021
See application file for complete search history.

(56) References Cited

U.S. PATENT DOCUMENTS

| | | | |
|---|---|---|---|
| 8,365,742 B2* | 2/2013 | Hon | A24F 47/008 131/273 |
| 2002/0151842 A1* | 10/2002 | Gonnelli | A61M 5/30 604/70 |

(Continued)

FOREIGN PATENT DOCUMENTS

| | | |
|---|---|---|
| CN | 203168033 U | 9/2013 |
| CN | 203262284 U | 11/2013 |

(Continued)

OTHER PUBLICATIONS

PCI, Crosslinking adhesives Technology, Oct. 2015; See, https://web.archive.org/web/20151024085817/https://www.pcimag.com/articles/86518-crosslinking-technology-for-fast-curing-high-performance-low-voc-coatings (Year: 2015).*

(Continued)

*Primary Examiner* — Dana Ross
*Assistant Examiner* — Lawrence H Samuels
(74) *Attorney, Agent, or Firm* — Perkins Coie LLP; Kenneth H. Ohriner

(57) ABSTRACT

An electronic cigarette has a housing (2) formed by a plurality of thin rolled up layers with one or more grooves (6a, 6b, 6c, 6d, 6e, 6f, 6g) on an inside or outer surface of the housing (2). The housing (2) allows an opening to be formed to allow battery (3) gases to escape, avoiding overpressurizing the housing (2), in the event of a battery (3) failure. The housing (2) may have a thickness of about 0.06 mm to about 2.5 mm. The layers may be bonded together by adhesives. The housing (2) may be formed around components of the electronic cigarette.

15 Claims, 3 Drawing Sheets

(56) References Cited

U.S. PATENT DOCUMENTS

| | | | | |
|---|---|---|---|---|
| 2003/0077505 | A1* | 4/2003 | Goda | H01M 2/0207 |
| | | | | 429/56 |
| 2005/0016550 | A1 | 1/2005 | Katase | |
| 2006/0263686 | A1* | 11/2006 | Zhao | B23K 26/22 |
| | | | | 429/211 |
| 2008/0145747 | A1* | 6/2008 | Wu | H01M 2/0202 |
| | | | | 429/56 |
| 2013/0167854 | A1* | 7/2013 | Shin | A24F 47/008 |
| | | | | 131/329 |
| 2014/0034071 | A1* | 2/2014 | Levitz | A24F 47/008 |
| | | | | 131/329 |
| 2015/0257449 | A1* | 9/2015 | Gabbay | A24F 47/008 |
| | | | | 392/386 |
| 2017/0188632 | A1* | 7/2017 | Hon | A24F 47/008 |

FOREIGN PATENT DOCUMENTS

| | | | |
|---|---|---|---|
| CN | 203407517 U | | 1/2014 |
| CN | 203589106 U | * | 5/2014 |
| CN | 203589106 U | | 5/2014 |
| GB | 1431029 | | 4/1976 |
| GB | 1541029 | | 2/1979 |
| JP | H10269998 A | | 10/1998 |
| JP | 2000182588 A | | 6/2000 |
| WO | 2004098324 A2 | | 11/2004 |
| WO | 2008015441 A1 | | 2/2008 |

OTHER PUBLICATIONS

Ellsworth, UV curable adhesives. https://www.cyberbond1.com/adhesives/uv-curing-adhesives/ (Year: 2015).*

Polymer Plastics Company, UV transmittance in polymers. https://polymerplastics.com/transparents_uvta.shtml (Year: 2015).*

Great Britain Intellectual Property Office, Combined Search and Examination Report for GB1415913.1, dated Jan. 29, 2015, 8 pgs.

State Intellectual Property Office, China, International Search Report and Written Opinion for PCT/CN2014/082484, dated Nov. 28, 2014, 14 pgs.

\* cited by examiner (a)

(b)

(a)

(b)

(c)

ELECTRONIC CIGARETTE WITH SOFT HOUSING

BACKGROUND OF THE INVENTION

Electronic cigarettes or vapor inhalers have batteries that may leak or outgas in use. In extreme cases, a battery failure could also result in overpressure within the e-cigarette housing. Current electronic cigarette designs are not well adapted for these types of circumstances. Accordingly, there is a need for improved electronic cigarette designs.

SUMMARY OF THE INVENTION

A new electronic cigarette has now been invented that provides significant improvements over existing designs, especially relative to battery malfunctions. In one aspect, a new electronic cigarette may have a housing formed in layers. The housing may have grooves on an inner surface of the housing, which allow ready formation of a pressure relief opening in the housing if the housing becomes overpressurized due to battery failure.

Another aspect of the invention relates to a method for making the new electronic cigarette as disclosed herein.

BRIEF DESCRIPTION OF THE DRAWINGS

In the drawings, the same reference number indicates the same element in each of the views.

FIG. 3a shows how the electronic cigarette housing is cut open and rolled out. FIG. 3b is a top view of the rolled-out housing. FIG. 3c is an end view of the housing.

DETAILED DESCRIPTION OF THE INVENTION

One aspect of the invention relates to an electronic cigarette comprising a housing and a battery in the housing, wherein the housing is formed by a plurality of layers of one or more films.

Figure 1:
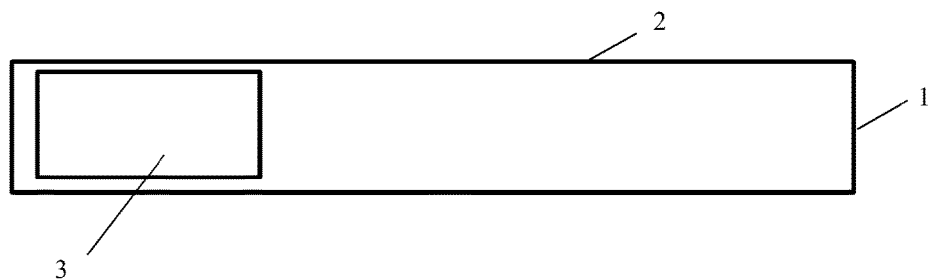
FIGS. 1(a) and 1(b) show section views of electronic cigarettes.
Figure 1:
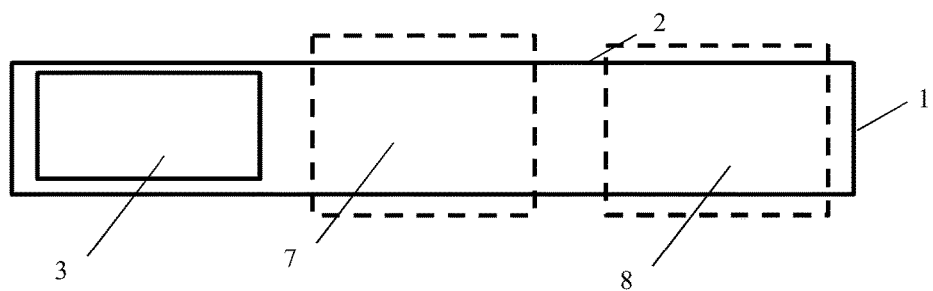

FIG. 1(a) illustrates an electronic cigarette 1 including a housing 2 and a battery 3 within the housing. FIG. 1(b) illustrates an electronic cigarette 1 comprising a tubular housing 2 as further described below; a battery 3 in the housing; an atomizer 7 and a sensor 8 in the housing electrically linked to the battery. A liquid supply is typically also included in the housing, adjacent to the atomizer.

Figure 2:
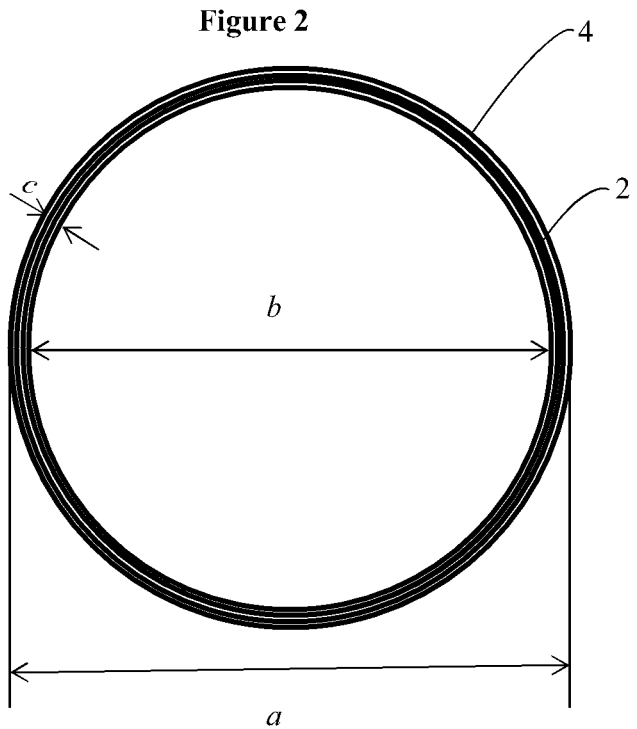
FIG. 2 shows an end view of an electronic cigarette of another embodiment of the invention.
Figure 3:
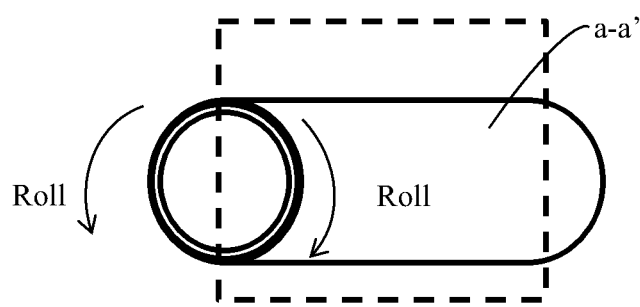
FIGS. 3(a)-3(c) illustrate a housing of an electronic cigarette of another embodiment after the housing is cut open and rolled out.
Figure 3:
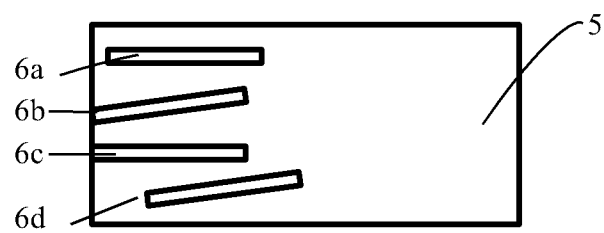
Figure 3:
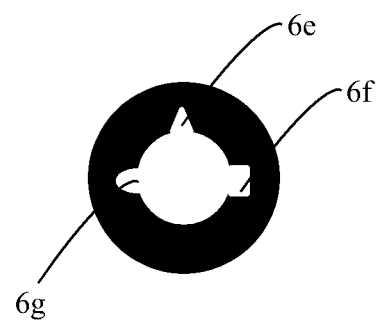

As shown in FIGS. 2-3, the housing 2 may be formed by layers of one or more films 4 with one or more grooves 6 on an inner or an outer surface of the housing.

As shown in FIG. 2, the outer diameter (a) of the housing may be about 5 mm to about 20 mm, about 5 mm to about 10 mm, or about 7 to about 9.2 mm. The inner diameter (b) of the housing may be about 3 mm to about 19 mm, about 3 mm to about 9 mm, or about 6 to about 8.2 mm. The wall thickness (c) of the housing may be about 0.06 mm to about 2.5 mm, about 0.06 mm to about 1 mm, about 0.06 mm to about 0.5 mm, about 0.06 mm to about 0.3 mm, about 0.06 mm to about 0.2 mm, about 0.06 mm to about 0.1 mm, or about 0.06 to about 0.09 mm. A suitable wall thickness provides a desired structural strength of the housing. A similar structural strength of the housing may be obtained with less wall thickness when the housing diameter is smaller.

As used herein the term "about" when used in front of a numeral number, it means a range of ±10% of the numeral number followed "about."

Referring to FIG. 3, the one or more grooves may be straight, and may take any orientation with at least part of the grooves preferably overlapping with the battery position in the housing. In FIG. 3a the housing is shown cut open from a center plane a-a' and rolled out. A top view of a side of the rolled-out housing 5 with multiple grooves 6a~6d is shown in FIG. 3b. When there are multiple grooves, the grooves 6a~6d may or may not be parallel to each other (e.g. parallel grooves such as 6a and 6c, and non-parallel grooves such as 6b and 6d). One or more of the grooves 6a~6d may overlap about half of the length of the battery, about two third of the length of the battery, or the whole length of the battery. One or more of the grooves 6a~6d may extend to one end or both ends of the housing (e.g. 6b and 6c, FIG. 3b). The one or more grooves may be spiral grooves.

FIG. 3c shows grooves of varying shape in cross section, including a triangle groove 6e, a rectangle groove 6f, and a curved groove 6g. Other shapes may also be used. It may be easier for a groove with a sharp angle (e.g. triangle groove 6e or star shaped grooves) to form a pressure relief opening in the housing. On the other hand, a groove with more rounded shape (e.g. curved groove 6g) may provide better strength of the housing. Grooves on the outer surface of the housing are easier to manufacture, but may weaken the housing more compared to grooves on the inner surface. Furthermore, it may be more difficult for grooves on the outer surface of the housing to form a pressure relief opening, if the housing becomes overpressurized from inside.

The type, shape, depth, length and position of the one or more grooves may be selected based on the material and dimensions of the housing, the type and position of the battery, and manufacturing requirements.

The one or more films used to form the housing may be polymers, metals (e.g. aluminum), metal alloys, a pulping related composition (e.g. paper), and/or composites thereof. Examples of polymer films include polyethylene (PE) and polypropylene (PP). Examples of metal alloys include FeCrAl, stainless steel alloys, copper alloys, and stainless steel-copper alloys. Examples of composite films include substrate films coated with metals or alloys.

The layers of the one or more films can be bound together by one or more adhesives applied to at least one side of the film (e.g. the side that will roll as the inside and/or the outside layer of the housing). The adhesives applied may be the same or different. The adhesives applied may be single-component adhesives, or multi-component adhesives. For multi-component adhesives (e.g. epoxy resin), different adhesive components may be applied on different sides. When the film is rolled up, the different adhesive components may react with each other and bind the layers together.

Examples of adhesives which may be used include adhesives that are curable by exposure to UV light, pressure, temperature, and/or moisture, by evaporation of one or more solvents, and/or by one or more cross-linking reactions of one or more adhesives. The adhesives may cure upon rolling up the films.

In certain embodiments, at least one of the one or more adhesives used is UV-curable, and the one or more films used are films that are at least partially transparent (e.g.

about 50% to about 100% transparent, about 75% to about 100% transparent, about 90% to about 100% transparent, or about 95% to about 100% transparent) to UV light. Examples of the at least partial UV transparent films are polymer films (e.g. PP, PE), paper. UV-curable adhesives generally comprise a resin (e.g. acrylic based resin), a monomer and a photoinitiator. Upon exposure to UV light, the photoinitiator is activated, and initiate curation among the monomers and/or the resin.

A heat-curable adhesive (e.g. epoxies, urethanes, and polyimides based adhesives) may alternatively be used in combination with heat resistant films, such as heat-resistant polymer films (e.g. PE), metal alloy films (e.g. FeCrAl, stainless steel alloys, copper alloys, and stainless steel-copper alloys), and paper.

Another alternative is pressure-curable adhesives (PSA). PSAs are usually based on an elastomer compounded with a suitable tackifier (e.g., a rosin ester). The elastomers can be based on acrylics (may or may not require a tackifier), biological-based acrylate, butyl rubber, ethylene-vinyl acetate (EVA) with high vinyl acetate content, natural rubber, nitriles, silicone rubbers, styrene block copolymers (SBC), or vinyl ethers. SBC usually has a A-B-A structure, with an elastic rubber segment between two rigid plastic endblocks. Examples of the endblocks include cumarone-indene, α-methyl styrene, vinyl toluene, aromatic hydrocarbons, etc. Examples of the rubber segment include, aliphatic olefins, rosin esters, polyterpenes, terpene phenolics, etc. Examples of SBC include, styrene-butadiene-styrene (SBS), styrene-ethylene/butylene-styrene (SEBS), styrene-ethylene/propylene (SEP), styrene-isoprene-styrene (SIS), etc.

The one or more films used with PSA are films that are can sustain the pressure required to cure the adhesive, such as polymer films (e.g. PE and PP), metal alloy films (e.g. FeCrAl, stainless steel alloys, copper alloys, and stainless steel-copper alloys), and paper.

Other options for the adhesive include: moisture-curable adhesives (e.g. cyanoacrylates and urethanes); an adhesive curable via evaporation of one or more solvents; or an adhesive curable by one or more reactions of one or more components (e.g. epoxy resin). These adhesives may be used with polymer films (e.g. PE and PP), metal alloy films (e.g. FeCrAl, stainless steel alloys, copper alloys, and stainless steel-copper alloys), or paper.

The housing may have a seam at the end of the one or more films that form the housing. The the seam may be covered by a wrapper or a coating covering the outer surface of the housing. For example, the wrapper can be formed by wrapping the wrapper to the outer surface of the housing, wherein one or more adhesives are applied to an outer surface of the housing and/or an inner surface of the wrapper, and cured to form the electronic cigarette. Optionally, the wrapper may be printed with patterns and/or letters and/or numbers, e.g. logo of the electronic cigarette. A coating may be formed by painting or spraying onto the outer surface of the housing. The adhesive is applied to provide sufficient adhesion of the films and may not have to be applied to the whole surface.

A method for manufacturing an electronic cigarette may include applying one or more adhesives to at least one side of one or more films; rolling the films to form a housing having a plurality of layers to a desired thickness to provide a desired strength of the housing; curing the adhesive; and making one or more grooves on an inner surface of the housing.

Optionally, the method may further include applying a wrapper to the outer surface of the housing before or after the curing step, wherein the inner surface of the wrapper and/or the outer surface of the housing are/is applied with one or more adhesives.

The following optional steps may also be performed: applying a coating as disclosed herein to the outer surface of the housing; rolling the film around the battery and/or other components of the electronic cigarette; positioning one or more spacers between the battery and the film, with the spacers removable or permanently attached after the housing is formed; installing the battery and/or other components of the electronic cigarette into the housing during the manufacturing process.

The grooves or score lines form an opening in the housing to release pressure in the event of battery failure. These features may also allow the housing to be more easily opened to access the battery or other components of the electronic cigarette for disposal. The electronic cigarette described may have a housing with a diameter as small as about 5 mm, with a wall thickness as thin as 0.06 mm.

The invention claimed is:

1. An electronic cigarette with a soft housing, comprising:
a cylindrical housing formed by two or more layers of a film of polymer, alloy, or pulping related composition bonded together via one or more adhesives; wherein:
the housing has a wall thickness of about 0.06 mm to about 2.5 mm;
the housing has one or more grooves on an inner surface of the housing, the one or more grooves configured for providing a pressure relief opening in the housing if the housing becomes over pressurized due to battery failure; and an atomizer, a liquid source and a sensor in the housing electrically linked to a battery.

2. The electronic cigarette of claim 1 wherein at least one groove overlaps about half of the length of the battery.

3. The electronic cigarette of claim 1 wherein the grooves are straight.

4. The electronic cigarette of claim 1 wherein the battery is in a battery position in the housing and the one or more grooves overlap the battery position, and the one or more grooves are on an inner surface of the housing.

5. The electronic cigarette of claim 1 wherein the one or more adhesives are selected from the group consisting of adhesives that are curable by exposure to UV light, pressure, temperature, and/or moisture, by evaporation of one or more solvents, and/or by one or more cross-linking reactions of one or more adhesives.

6. The electronic cigarette of claim 5 wherein the adhesives that are curable by exposure to UV light are acrylic based adhesives.

7. The electronic cigarette of claim 5 wherein the adhesives that are curable by exposure to heat are epoxies, urethanes, or polyimides based adhesives.

8. The electronic cigarette of claim 5 wherein:
the adhesives are curable by exposure to UV light; and
the film is a film of polymer and/or a pulping related composition that is at least partially transparent to UV light.

9. The electronic cigarette of claim 8 wherein one layer of the polymer film is about 50% to about 100% transparent to the UV light.

10. The electronic cigarette of claim 9 wherein the polymer is selected from the group consisting of polypropylene and polyethylene.

11. The electronic cigarette of claim 8 wherein the pulping related composition is paper.

12. The electronic cigarette of claim 5 wherein:
the adhesives are curable by exposure to heat; and
the film is an alloy film.

13. The electronic cigarette of claim 12 wherein the alloy is FeCrAl, a stainless steel alloy, a copper alloy, or a stainless steel-copper alloy.

14. The electronic cigarette of claim 5 wherein:
the adhesives are curable by cross-linking reaction of a first adhesive composition and a second adhesive composition;
a first side of the film is applied with the first adhesive composition; and
a second side the film is applied with the second adhesive composition.

15. An electronic cigarette having a soft housing, comprising:
a cylindrical housing formed by two or more layers of paper or polymer film bonded together via one or more UV curable adhesives, wherein the layers of paper or polymer film are 50 to 100% transparent to UV light;
the housing has a wall thickness of about 0.06 mm to about 2.5 mm;
the housing has one or more grooves on an inner surface of the housing, the one or more grooves configured for providing a pressure relief opening in the housing it the housing becomes over pressurized due to battery failure; and
an atomizer, a liquid source and a sensor in the housing electrically linked to a battery in a battery position in the housing, and with the one or more grooves overlapping the battery position.

* * * * *